United States Patent [19]

Brook et al.

[11] E Re. 31,474

[45] Reissued Dec. 27, 1983

[54] TREATMENT OF ALLOYS

[75] Inventors: Greville B. Brook, Beaconsfield, England; Roger F. Iles, Foster City, Calif.

[73] Assignee: Fulmer Research Institute Limited, Stoke Poges, England

[21] Appl. No.: 607,553

[22] Filed: Aug. 25, 1975

Related U.S. Patent Documents

Reissue of:

[64] Patent No.: 3,783,037
Issued: Jan. 1, 1974
Appl. No.: 88,596
Filed: Nov. 12, 1970

[30] Foreign Application Priority Data

Nov. 12, 1969 [GB] United Kingdom ..... 55482/69
Nov. 14, 1969 [GB] United Kingdom ..... 55969/69

[51] Int. Cl.[3] ..... C22F 1/08; C22F 1/14
[52] U.S. Cl. ..... 148/11.5 R; 148/11.5 C; 148/400
[58] Field of Search ..... 148/11.5 R, 11.5 C, 148/32

[56] References Cited

U.S. PATENT DOCUMENTS

| | | | |
|---|---|---|---|
| 3,347,717 | 10/1967 | Eichelman, Jr. et al. | 148/11.5 R |
| 3,351,463 | 11/1967 | Rozner et al. | 148/11.5 R |
| 3,374,123 | 3/1968 | Masumoto et al. | 148/11.5 R |
| 3,558,369 | 1/1971 | Wang et al. | 148/11.5 R |
| 3,567,523 | 3/1971 | Jackson et al. | 148/11.5 R |

OTHER PUBLICATIONS

Suoninen, E. J. et al.; Trans. AIME, Journal of Metals; Feb. 1956, p. 283.

Genevray, A. M.; Martensitic Transformation in Muntz Metal; MIT Thesis; May 1953.

Suoninen, E. J.-Investigation of the Martensitic Transformation in Metastable B Brass, Aug. 1954.

Hornbogen, E. et al; Influences of Stress on the Occurrence of Transformations of the $B_1$-$B^{11}$ Transformation in Brass; Z. Met.

Christian, J. W. et al.; Intermetallic Compounds Ed. Westbrook; "Crystallographic Transformations"; pp. 428-449; Published, Wiley 1967.

Rothwarf et al.; "Feasibility of Using Memory Metal Effect for Fuse Applications"; Memorandum Report M68-38-1; Dept. of Army, Frankford Arsenal, Philadelphia; Nov. 1968.

Arbuzova, I. A. et al.; Abnormal Elongation and Reduced Resistance to Plastic Deformation due to Martensitic Transformation in Cu-Al-Ni; Fiz. Met. & Metallowed, 17(7) 390; 1964.

Busch et al.; *Alloys of Improved Elastic Properties;* Report No. AMRA CR-65-02/1; Final Report Part 1; pp. 1, 13, 14, 43-49; Feb. 1966.

*Primary Examiner*—W. Stallard
*Attorney, Agent, or Firm*—Brady, O'Boyle & Gates

[57] ABSTRACT

A method of making a heat-recoverable article in which an alloy comprising an intermetallic compound, which on cooling transforms into a banded martensite by shear with or without working, deformed after appropriate heat treatment so that on reheating it at least partly resumes its original shape. It is preferred to use a copperbase alloy which transforms into a martensite of pseudocubic symmetry.

34 Claims, No Drawings

Figure 1:
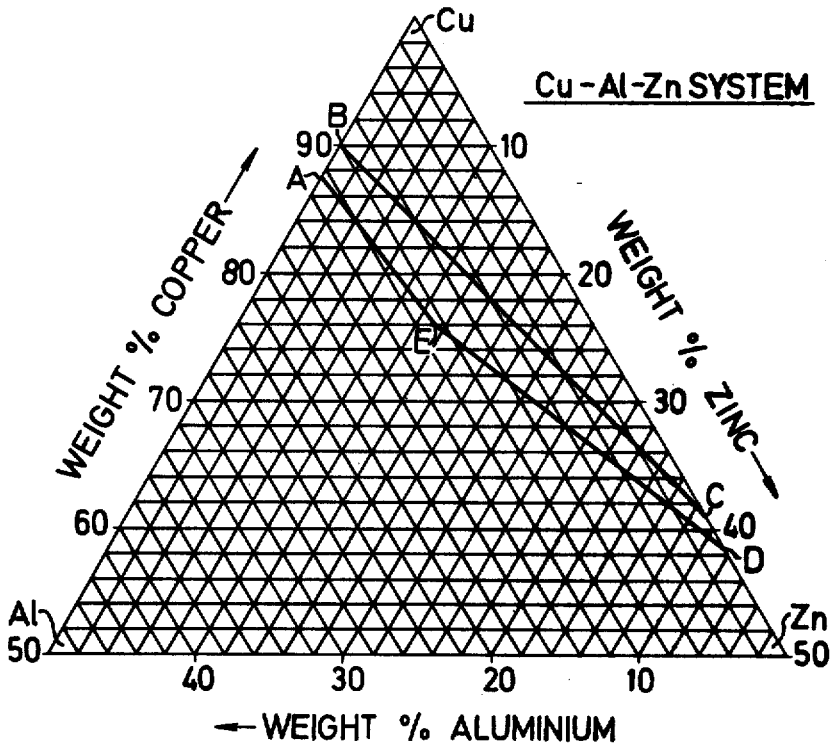

FIG. 7.
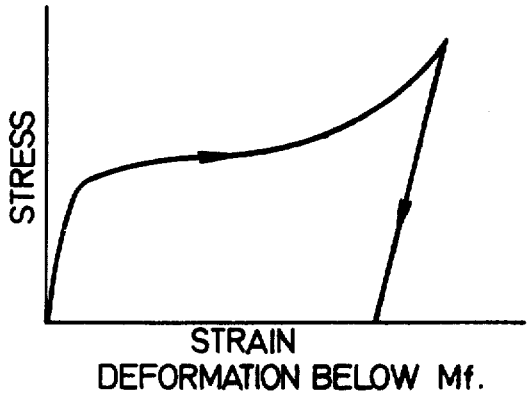
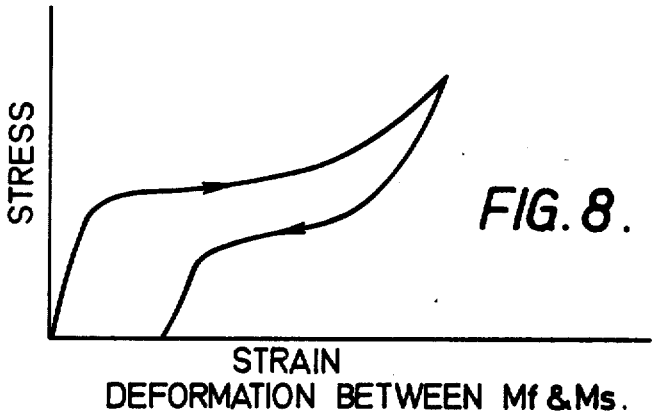
FIG. 8.
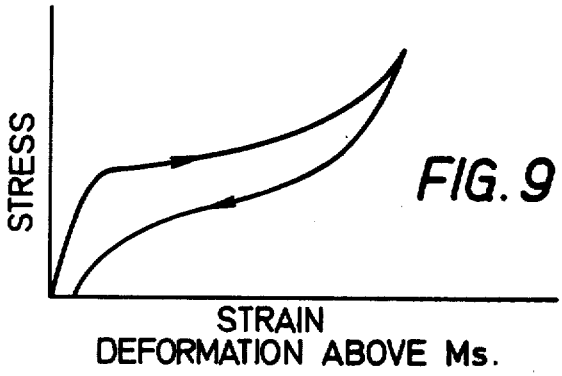
FIG. 9.

TREATMENT OF ALLOYS

Matter enclosed in heavy brackets [ ] appears in the original patent but forms no part of this reissue specification; matter printed in italics indicates the additions made by reissue.

This invention is concerned with methods of treating alloys.

It is known that certain alloys are heat-recoverable, that is to say, when a suitably heat-treated article of one shape made from the alloys is caused to deform into another shape at an appropriate temperature and the temperature is subsequently raised sufficiently, the article will recover its original shape at least in part. This change of shape on reheating corresponds to a change of phase in the alloy from a low-temperature to a high-temperature phase.

We have discovered that this property of change of shape with temperature can be obtained with certain alloys comprising an intermetallic compound in which it is possible by rapid quenching or other suitable heat treatment to produce a martensitic transformation and in which the martensite exhibits a high apparently elastic hysteresis. We have also discovered that it is advantageous, but not necessary, if ordering of the constituents takes place before transformation. These alloys can be made to undergo a reversible shape change with temperature reversal. If the alloys are deformed at a suitable temperature after appropriate cooling and then reheated to above a certain temperature the alloys will transform to a stable high temperature phase and revert to their original shape. Provided the alloys are not reheated to too high a temperature they will revert to or towards the shape to which they were deformed after cooling again.

According to the present invention, there is provided a method of making a heat-recoverable article, which method comprises cooling an alloy in a first shape from a first temperature to a lower temperature, said alloy comprising an intermetallic compound which on cooling from said first temperature undergoes a shear transformation to a banded martensite or which retains its first temperature structure or a related ordered structure as cooled from said first temperature but transforms into a banded martensite by shear on working in the cooled condition in such a way that the transformation is not fully reversible by unloading and which in the cooled condition has an anomalously low modulus of elasticity during loading, and then plastically deforming the alloy into a second shape at the lower temperature, the temperatures and rate of cooling being such that on reheating the article at least partly, resumes its first shape.

Preferably the alloy contains at least 50% by weight of copper in the form of an intermetallic compound and said martensite has pseudo-cubic symmetry.

In one manner of performing the invention, said rate of cooling and lower temperature are such that the alloy has undergone (preferably fully, but in some cases partially) a shear transformation to a banded martensite before being plastically deformed into said second shape. Thus, the alloy is plastically deformed into the second shape at or below the temperature at which the martensite transformation starts in the absence of externally applied stress (the $M_s$ temperature) and preferably below the temperature at which the martensite transformation is completed in the absence of externally applied stress (the $M_f$ temperature). On reheating above a certain temperature (the $A_s$ temperature), the alloy will start to transform back to the high temperature phase and this transformation will be accompanied by a change in shape towards said first shape. Above a certain temperature (the $A_f$ temperature), the transformation to the high temperature phase will be complete.

In another manner of performing the invention, said rate of cooling and lower temperature are such that the alloy retains its first temperature structure or a related ordered structure at said lower temperature and the plastic deformation into said second shape causes a shear transformation into a banded martensite. Thus, the alloy in its stable ($\beta$) or metastable high temperature phase is plastically deformed into the second shape above the $M_s$ temperature. The application of the deforming stress produces a martensite similar to that obtained by cooling below the $M_s$ temperature. On reheating, the stress-induced martensite transforms back to the original high temperature phase and the alloy changes in shape towards said first shape. If desired, after said plastic deformation above the $M_s$ temperature (and before reheating), the alloy may be cooled further below the $M_s$ (and preferably below the $M_f$) temperature, with or without the application of external stress. The transformation into martensite (if not already completed by the application of the deforming stress) will continue with a further change in shape in the direction dictated by said deforming stress. On reheating above the $A_s$ temperature the shape will change towards the first shape.

Whichever of the above methods is used, the amount of heat-recoverable strain is greater when the plastic deformation is effected at temperatures closer to the $M_s$ and $M_f$ temperatures.

The copper-containing intermetallic compounds which give the best results are those in which the high temperature body centred cubic phase of A2 structure transforms on rapid cooling ultimately to a martensite which, though of complex crystal structure such as an orthorhombic structure, has pseudo-cubic symmetry. Such martensites are characterized by having a metallographic structure containing high densities of stacking faults. Alloys with this structure can be readily deformed at and near the $M_s$ and $F_f$ temperatures with extensive ductility as will be described hereinafter. Such an alloy may be found, for example, in the copper-zinc system where the $\beta$ phase of appropriate composition of A2 BCC structure first orders to a B2 (Cs Cl type) BCC structure which subsequently transforms on further cooling to a faulted martensite of pseudo-cubic symmetry. Another example may be found in the copper-aluminium system where the structure of the final martensite is dependent on composition. An alloy with 10–11% aluminium does not order before transforming to a faulted martensite of pseudo-cubic symmetry. An alloy with 11 to 13% aluminium first orders to a BCC ($Fe_3Al$ type) structure based on the theoretical composition $Cu_3Al$ before subsequent transformation to a faulted martensite of pseudo-cubic symmetry. These structures in copper-aluminium alloys have less ductility that those rising from alloys having the structural sequence found in copper-zinc alloys. The above-mentioned alloys containing 10 to 13% aluminium are to be distinguished from those containing higher aluminium contents, in which the ordered BCC phase transforms to a twinned martensite with a structure of pseudo-hexagonal symmetry and these alloys have insufficient ductility to be of practical value.

Thus the alloys preferably used in the present invention are those which transform martenstically to a faulted martensite of pseudo-cubic symmetry. Such structures may be found, for example, in a binary copper-zinc alloy, a binary copper-aluminium alloy, a ternary copper-aluminium-zinc alloy, a ternary copper-zinc-tin alloy, a ternary copper-zinc-silicon alloy, a ternary copper-zinc-manganese alloy, a ternary copper-aluminium-iron alloy and a ternary copper-aluminium-nickel alloy.

The alloy may of course contain impurities and/or other incidental elements included to modify the properties of the alloy provided that an intermetallic compound of copper exhibiting the required martensite transformation is maintained, and the alloy is not necessarily a binary or ternary alloy.

The alloy may be a two-phase or multi-phase alloy in which at last one phase is an intermetallic compound of copper as hereinbefore defined. The other phase or at least one of the other phases may consist of a primary solid solution which is heat-recoverable as described in our co-pending patent application No. 55,481/69.

A primary solid solution as meant in this specification is obtained when atoms of one or more different elements can be added to a pure metal without producing a change of crystal structure, by replacing atoms in the various sites of the pure metal crystal structure.

An intermetallic compound as meant in this specification is the single phase produced, other than a primary solid solution, when two or more elements are alloyed together in the correct proportions. It usually has a crystal structure different from that of any of the pure elements and usually includes a composition corresponding to a simple ratio of atoms e.g. $A_xB_y$ where A and B are elements and x and y are numbers usually below 10. It includes such phases which also exhibit a range of solubility for the component elements around the simple atomic ratio without a change of crystal structure.

The anomalously low modulus of elasticity on loading and the high elastic hysteresis of alloys used in the present invention are illustrated in the stress/strain curves shown in FIGS. 7 and 8. FIG. 7 shows the behavior of many of the alloys found on deformation below $M_f$ temperature and FIG. 8 shows the behavior of many of the alloys found on deformation between $M_s$ and $M_f$ temperatures. As the temperature of deformation is increased above $M_s$ towards $M_d$, the behavior of many of the alloys on deformation is represented by FIG. 9 in which significant amounts of retained strain are only obtained if the alloy is deformed beyond the limit of pseudo elasticity as indicated in FIG. 9.

We have found that alloys used in this invention have high internal frictions or damping capacities when heat-treated in the manner described i.e. cooled from the appropriate temperature in such a manner that they undergo the martensitic transformation. This internal friction or damping capacity reaches its highest value at temperatures near to the $M_s$ anw $F_f$ temperatures.

In alloys with an $M_s$ temperature above room temperature we have discovered that when they are quenched to −196° C. in the martensitic condition and are deformed at −196° C. in the manner of the invention, the restoration of the original shape on heating above the $A_s$ temperature takes place in two stages. If the alloy is deformed in tension at −196° C., a contraction occurs slowly on heating from −196° C. to 20° C. so as to balance the termal expansion normally expected. Thus the alloy behaves as if it has zero or near zero thermal expansion over this range of temperature.

We have also discovered that the extent of the shape change on heating an article made of alloys treated according to this invention, can be reduced or even prevented by applying sufficient stress to oppose the shape change. The removal of this stress after heating to the upper temperature (i.e. above the $A_s$ temperature) allows the shape change to occur spontaneously instead of over a range of temperature as would have occurred in the absence of the opposing stress. The stress required to prevent the shape change whilst heating to a specific temperature is a measure of the force which can be developed by the alloy for doing external work.

This discovery can be used in several ways. One method is to suppress or partially suppress the shape change by an applied stress and then to use the force or energy released when the restraining force is removed suddenly to operate a device, for example, through a level or by impact on a pin or by deforming or fracturing a suitable element of the device. Another method to use the force developed is to heat the part made from the heat recoverable material slowly through the $A_sA_f$ temperature range when it will exert a sustained and progressively increasing force on the operating element of the device as mentioned before. By control of the temperature, the rate and amount of increase of force or of movement can be controlled.

The methods described in our co-pending U.K. patent application No. 22,372/69 are applicable in connection with the present invention.

Thus, in carrying out the present invention, there may be applied to the alloy in its high-temperature phase a strain which produces a stress which induces a desired shape of its low-temperature phase.

Said strain may be applied by deforming the alloy in its high-temperature phase partly towards the shape required for the low-temperature phase, the temperature being subsequently lowered so that the alloy changes into its low-temperature phase. The change into the low-temperature phase is accompanied by a continued change of shape into the desired shape without the application of an external force. This form of the invention is of great practical value since it provides a means of putting an alloy at a comparatively high temperature into a condition in which it will deform spontaneously at lower temperatures to a new shape which is dictated by the initial high temperature deformation. It is therefore unnecessary to effect working of the alloy at low temperatures. In practice, the metastable high temperature phase of the alloy is cooled to between its $M_d$ and $M_s$ transformation temperatures. $M_d$ is the temperature of the start of the martensitic transformation under stress and $M_s$ is the temperature of the start of the transformation without applied stress. With some alloys the temperature should be as close to the $M_s$ transformation temperature as possible, e.g. within 10° C., to obtain the desired residual internal stress by said partial deformation. In other alloys a greater margin of temperature above $M_s$ is possible. A suitable temperature for a given alloy can readily be found by experiment. The alloy is then deformed a small amount (i.e. less than the final strain it is desired to put into the low temperature phase). Cooling is continued to below the $M_s$ transformation temperature when the alloy will continue to change in shape in the direction indicated by the prior deformation. On reheating this change of shape is wholly or partly reversed and on cooling again the change in shape towards the low temperature shape occurs spontaneously. Continued heating and cooling is accompanied by continued changes in shape.

In another method, the alloy is deformed into a desired shape in its low-temperature phase and said strain is applied by raising the temperature so that the alloy changes into its high-temperature phase while restraint is applied to the alloy to prevent a change in shape. Thus, according to one aspect of the invention, there is provided a method of making a heat-recoverable article from a heat-recoverable alloy, which method includes the steps of shaping the alloy at an elevated temperature into a first shape, cooling to a lower temperature, deforming the alloy at the lower temperature into a second shape, said temperatures being such that if reheated without restraint to an appropriate temperature the alloy would at least partly resume its first shape, and reheating the alloy to said appropriate temperature while subjecting it to restraint which prevents a change of shape. Depending on the temperature involved and the intended use of the article, the alloy may be cooled to the lower temperature after reheating, still retaining the second shape. Then if the alloy is reheated without restraint it will change wholly or partly to its first shape but on cooling will revert wholly or partly to its second shape. Continued heating and cooling is accompanied by continued changes in shape.

The provision of restraint when reheating induces a residual internal stress as aforesaid in the alloy at high temperature so that, it is considered, on cooling, the nuclei which are activated on transformation are those which caused the original change in shape on deformation at the low temperature. The same activation is thought to be obtained by partial initial deformation before cooling to the low-temperature phase, when it is considered that sufficient nuclei of the low temperature martensitic phase are activated by the initial deformation on such orientations that on cooling the alloy continues its change of shape.

Reheating under restraint is particularly useful since it enables the upper temperature to which the alloy is heated to be so far above the transformation temperature that continued reversibility of shape would be lost in the absence of restraint. Nevertheless, the upper temperature must not be sufficient for relaxation of stress to occur by plastic deformation, e.g. creep, or reversibility will be lost.

In all cases, the temperature to which the alloy is heated should be too low for ageing or tempering of the alloy to take place. If precipitation occurs, the alloy assumes its high temperature shape permanently.

We have found that the restraint need not always be applied by external mechanical means such as a jig. In some cases, an oxide skin, a metal coating or the like can provide the necessary restraint.

EXAMPLES

(i) Binary copper-zinc alloys containing 38.6 weight percent to 41.5 weight percent zinc The lower limit of zinc corresponds to the minimum solubility for zinc at which the $\beta$ phase is stable. The upper limit of zinc corresponds to an $M_s$ temperature of about −250° C. Preferred alloys had compositions between 39.3% and 41.5% zinc.

These alloys normally have an $\alpha+\beta$ phase structure if cooled slowly to room temperature. To obtain heat recoverable properties the alloys must be quenched from at least 870° C. to retain a $\beta$ phase which will transform martensitically when cooled below room temperature.

Alloys within the range 39.3% to 40.7% Zn were all below their $M_s$ temperatures when deformed at −196° C., and the strain thus caused was partly or wholly recoverable when they were heated above their $A_S$ a temperature.

The results for an alloy containing 40.7 wt. percent zinc which was deformed at a temperature 15° C. below its $M_s$ are given in Table I.

TABLE I

| Retained strain at 15° C. below $M_s$ (percent): | Heat recoverable strain (percent) |
|---|---|
| 1.6 | 1.6 |
| 4.0 | 3.9 |
| 5.4 | 5.2 |
| 7.2 | 6.7 |
| 8.9 | 8.3 |

These experiments were conducted upon specimens with a grain size of approximately 3–4 mm. A similar series of experiments in which samples were strained at a temperature 15° C. below the $M_s$ were performed upon an alloy containing 39.5 wt. percent of zinc and which had a grain size of approximately 1 mm.

The results are given in Table II.

TABLE II

| Retained strain (percent): | Heat recoverable strain (percent) |
|---|---|
| 4.7 | 3.7 |
| 6.2 | 4.7 |
| 8.3 | 5.5 |
| 11.3 | 5.5 |

The results of these two series of experiments demonstrate that in binary CuZn alloys, the grain size is an important variable, and for a specific strain at a specific temperature below the $M_s$, the amount of heat recoverable strain increases as the grain size increases. Experiments were performed upon both alloys in which specimens were deformed the same amount at progressively lower temperatures below the $M_s$. The results for the 39.5 wt. percent zinc alloy shown in Table III demonstrate that the amount of recovery decreases as the difference between the $M_s$ and deformation temperature is increased.

TABLE III

| | Percent | |
|---|---|---|
| Temp. below $M_s$ at which strained | Retained strain | Heat recoverable strain |
| 5° C. | 5 | 4.2 |
| 35° C. | 5 | 4.0 |
| 111° C. | 5 | 3.2 |

An alloy containing 41.5 wt. percent zinc had an $M_s$ of −250° C. and was deformed at −196° C., i.e. 54° C. above its $M_s$. When, after deformation at this temperature, the load was released there was an extremely large elastic springback which left little residual deformation. However, as soon as the specimen was heated a large amount of this permanent deformation was recovered. The results for the complete series of experiments performed upon this alloy are given in Table IV.

TABLE IV

| Total strain at −196° C. | Apparent elastic contraction | Percent Retained strain at −196° C. | Strain recovered on heating to +20° C. | Permanent plastic strain |
|---|---|---|---|---|
| 6 | 4.6 | 1.4 | 1.05 | 0.35 |
| 8 | 5.0 | 3.0 | 2.60 | 0.40 |
| 10 | 5.5 | 4.5 | 4.15 | 0.35 |
| 12 | 6.0 | 6.0 | 5.4 | 0.6 |

This extremely large elastic springback was due to deformation of the alloy above its $M_s$. At such temperatures, a stress induced martensite phase is produced. Upon release of the stress, this phase partly reverts back to the original stable parent phase causing the high apparently elastic recovery.

(ii) Binary copper aluminium alloys containing 10.0% to 13.0 weight percent aluminium The lower aluminium limit corresponds to the minimum solubility of Al in the phase $\beta$ at 950° C. which gives an alloy of $M_s$ temperature about 500° C. when quenched from 950° C. The addition of aluminium made the alloy progressively more brittle until beyond 13% it became difficult to deform the alloy without causing fracture. Whilst heat recovery properties exist in alloys with more than 13% Al, an alloy with 13% Al represented a practical upper limit beyond which the invention cannot be performed satisfactorily.

The alloys were tested by a simple bending technique since some of them were too brittle to test in tension. The amount of deformation which could be produced in these alloys before failure was approximately 2% which corresponds to a right angle bend on a 1/32" thick strip of alloy. A series of alloys was studied in the composition range 10 wt. percent to 13 wt. percent Al. The $M_s$ of the 10 wt. percent Al alloy was +500° C. and that of the 13 wt. percent Al alloy +240° C. The alloys were quenched into water from 1000° C. and consequently at room temperature they were martensitic. The grain size was large which contributed to the lack of ductility.

Each alloy was bent to a 60° bend from its original position at a temperature just below its $M_s$ and heated above the $A_s$. All of the alloys recovered very closely to their original straight position (within 0°-5°), the temperature of the start of recovery corresponding very closely to the $A_s$ temperature. In these alloys, the amount of heat recoverable strain was less dependent on the deformation temperature below the $M_s$ than in the case of the Cu-Zn binary alloys, and in fact, recovery was obtained from an alloy with an $M_s$ of +320° C. after deformation at +20° C.

(iii) Ternary copper-aluminium-zinc alloys

Ternary alloys within the preferred composition range in this ternary system showed a graduation in heat recoverable properties from those of one binary alloy to the other. An advantage of this ternary system was that alloys with $M_s$ temperatures intermediate between the high ones of the Cu-Al system and the low ones of the Cu-Zn system were possible.

The preferred composition limits of this system are given below in conjunction with FIG. 1.

Wt. percent (A) 87, Cu; 13, Al (B) 90, Cu; 10, Al (C) 61.4, Cu; 38.6, Zn (D) 58.5, Cu; 41.5, Zn (E) 76, Cu; 13.5, Zn; 10.5, Al After quenching from 950° C. and then deformation at temperatures either above or below the $M_s$ all alloys within this preferred composition range exhibited heat recoverable properties when they were heated above their $A_s$.

Alloy 493 of nominal composition 65.75 wt. percent Cu, 2.5 wt. percent Al, 31.75 wt. percent Zn had an $M_s$ of −105° C. Recovery experiments were conducted upon specimens deformed over a range of temperatures both above and below the $M_s$; the results are shown in Table V.

TABLE V

| Def. temp., °C. | Def. | Percent Apparent elastic contraction | Retained strain | Heat recoverable strain |
|---|---|---|---|---|
| 20 | [a]5 | | | |
| 20 | 3 | 1.2 | 1.8 | 0.1 |
| −84 | [a]13 | | | |
| −84 | 3 | 2.8 | 0.2 | 0.1 |
| −84 | 6 | 5.4 | 0.6 | 0.5 |
| −84 | 10 | 6.8 | 3.2 | 2.0 |
| −104 | [a]16 | | | |
| −104 | 10 | 3.8 | 6.2 | 5.4 |
| −104 | 14 | 4.4 | 9.4 | 7.3 |
| −125 | [a]16 | | | |
| −125 | 8 | 2.4 | 5.6 | 5.6 |
| −125 | 14.5 | 3 | 11.5 | 9.35 |
| −125 | 15.5 | 3 | 12.5 | 10.25 |
| −196 | [a]9 | | | |
| −196 | 3 | 1.3 | 1.7 | 1.7 |
| −196 | 6 | 1.3 | 4.7 | 4.4 |
| −196 | 8 | 1.8 | 6.2 | 5.7 |
| −196 | 8.5 | 1.9 | 6.6 | 6.1 |

[a]Maximum possible deformation prior to failure. Specimen tested to failure.

These results demonstrate that maximum recovery is obtained from specimens deformed at a temperature corresponding to the $M_f$ temperature (−125° C.), since at this temperature martensite is stable and less elastic recovery due to reverse transformation occurs on unloading. The results show the dependence of the amount of recovery upon the amount by which the deformation temperature is below the $M_f$, i.e. the greater the temperature difference between the $M_f$ and the deformation temperature, the smaller the amount of recovery from any one specific deformation. The results also indicate that recovery can be obtained from specimens deformed above the $M_s$, the amount of recovery decreasing as the deformation temperature is increased above the $M_s$. For an alloy to exhibit heat recoverable properties after deformation at temperatures above the $M_s$, the maximum temperature difference between the deformation temperature and the $M_s$ is approximately 100° C. At such temperatures, the amount of recovery is extremely small, and in practice the temperature should be close to the $M_s$.

When deforming above the $M_s$ alloys which have an $M_s$ greater than 150° C., care must be taken since at these temperatures decomposition of the $\beta$ phase may take place to an extent that the residual $\beta$ phase has a much lower $M_s$ temperature.

A similar series of experiments were conducted upon a number of other alloy compositions and the results are summarized in Table VI.

TABLE VI

| Alloy | Def. temp., °C. | Def. | Apparent elastic contraction | Retained strain | Heat recoverable strain |
|---|---|---|---|---|---|
| | | Percent | | | |
| 507, $M_s$ (−50° C.) | −196 | [a]6.6 | | | |
| | −196 | 6.0 | 1.4 | 4.6 | 4.4 |
| | −196 | 4.9 | 1.3 | 3.6 | 3.5 |
| | −196 | 3.9 | 1.0 | 2.9 | 2.55 |
| | −54 | [a]8.4 | | | |
| | −54 | 8.1 | 2.3 | 5.8 | 4.8 |
| | −54 | 4.5 | 1.6 | 2.9 | 2.65 |
| | +25 | 4.0 | | | |
| | +25 | 2.0 | 1.5 | 0.5 | 0.2 |
| 508, $M_s$ (−10° C.) | −196 | [a]6.8 | | | |
| | −196 | 6.6 | 1.2 | 5.4 | 3.75 |
| | −16 | [a]7.1 | | | |
| | −16 | 6.1 | 2.1 | 4.0 | 4.0 |
| | +25 | 6.8 | | | |
| | +25 | 6.3 | 5.7 | 0.7 | 0.2 |
| 510, $M_s$ (+50° C.) | +20 | [a]6.0 | | | |
| | +20 | 5.0 | 1.5 | 3.6 | 2.8 |
| | +20 | 3.0 | 1.0 | 2.0 | 1.3 |

[a]Maximum possible deformation prior to failure. Specimens tested to failure.

The nominal compositions of these alloys are given below:

Wt. percent (507 72, Cu; 22, Zn; 6, Al
(508) 75.5, Cu; 17, Zn; 7.5, Al
(510) 82.25, Cu; 6.0, Zn; 11.75, Al The $M_s$ of alloy 507 was −50° C. and of alloy 508 −10° C. and of alloy 510 +50° C.

From the results of the experiments upon alloy 493, 507, 508 and 510 it is apparent that after deformation at a temperature just below the $M_s$, the amounts of heat recoverable strain on reheating above the $A_s$ was very close to the amount of retained deformation that was produced in the specimen by straining, It will be noted that, as there is progressive increase in the aluminium content and decrease in the zinc content in the order 493, 507, 508, 510, the maximum ductility that can be produced in the ternary alloys when deformed at or very close to the $M_s$ decreases. The maximum ductility (measured as total strain) that can be produced in the binary Cu-Zn and Cu-Al alloys when deformed between $M_s$ and $M_f$ is respectively 25% and 2%.

In all alloys in this system when deformed at the $M_s$ temperature, virtually all the retained strain can be recovered on heating (except at very high deformation, e.g. above 10%). However as aluminium replaces zinc, the maximum retained strain and therefore the maximum heat recoverable strain decreases.

Alloys 493, 507, 508 and 510 all had their $M_s$ temperature below 100° C. A number of experiments were performed upon alloys whose $M_s$ was above 100° C. Examples of the results obtained from these experiments will be given for three of those alloys tested; namely alloys 483, 484, and 485. The nominal compositions of these alloys is given below:

Wt. percent (483) 85.75, Cu; 11.75, Al; 2.5, Zn
(484) 84.0, Cu; 11.25, Al; 4.75, Zn
(485) 82.25, Cu; 10.5, Al; 7.25, Zn The $M_s$ temperature of these alloys was 250° C., 170° C. and 140° C. for the alloys 483, 484, and 485 respectively.

The recovery experiments were conducted upon specimens deformed between −196° C. and +300° C. Since, after deformation at every temperature, recovery was observed, these alloys behave in a similar manner to those described above in that they recover after deformation at temperatures either above or below the $M_s$. The results of these experiments are summarized in Table VII.

TABLE VII

| Alloy | Def. temp., °C. | Retained strain | Heat recoverable strain |
|---|---|---|---|
| | | Percent | |
| 4.83 ($M_s$ 250° C.) | 300 | 2.0 | 0.35 |
| | 250 | 3.8 | 1.65 |
| | 150 | 3.0 | 1.25 |
| | 20 | 2.6 | 0.95 |
| | −196 | 4.0 | 1.9+C. |
| 484 ($M_s$ 170° C.) | 220 | 3.0 | 1.3 |
| | 170 | Fractured | |
| | 70 | 3.6 | 1.4 |
| | 20 | 3.2 | 1.6 |
| | −196 | 3.2 | 2.0+C. |
| 485 ($M_s$ 140° C.) | 180 | 3.3 | 2 |
| | 130 | 3.5 | 1.7 |
| | 20 | 3.0 | 1.65 |
| | −196 | 5.0 | 3.9+C. |

One important observation from this series of experiments was that there appeared to be a double recovery in specimens deformed at −196° C. After tensile deformation at −196° C., there was a very small contraction (i.e. recovery) of approximately 0.35% over a range of temperature around −120° C. On further heating the material expanded thermally until the $A_s$ temperature was reached when a large contraction occurred. The recovery between −196° C. and 20° C. was confirmed by a simple bending experiment. This phenomenon was also observed in the alloy 510. Although the first stage recovery was very small, since it acts in the opposite direction to normal thermal expansion, the alloys appeared to have a zero coefficient of thermal expansion over a wide range of temperatures (approximately −196° C. to +80° C.). This phenomenon is very similar to that observed in the commercial "Invar" alloys. These alloys which are generally based upon the composition Fe-35% $N_i$ have an overall zero coefficient of thermal expansion over a wide range of temperatures, this range depending upon both composition and thermal treatment.

To illustrate the discovery that the amount of shape change on heating alloys treated according to this invention can be reduced by applying an opposing stress, specimens of alloy 493 were deformed in tension at −196° C. to produce a strain of 4.5%. They were then stressed and heated to ambient temperature which is well above the $A_f$ temperature. The results obtained are shown in Table VIII below.

TABLE VIII

| Retained load (p.s.i.) | Perm. def. | Recovery | Max. recovery |
|---|---|---|---|
| | Percent | | |
| 0 | 4.5 | 4.5 | 100 |
| $5 \times 10^3$ | 4.5 | 4.45 | 99 |
| $10 \times 10^3$ | 4.5 | 4.25 | 94 |
| $15 \times 10^3$ | 4.5 | 3.65 | 82 |
| $20 \times 10^3$ | 4.5 | 3.60 | 80 |
| $25 \times 10^3$ | 4.5 | 3.20 | 72 |
| $30 \times 10^3$ | 4.5 | 2.25 | 50 |
| $35 \times 10^3$ | 4.5 | 0 | 0 |

On unloading the samples there was a spontaneous contraction.

(iv) Ternary Cu-Zn-Sn alloys

Figure 2:
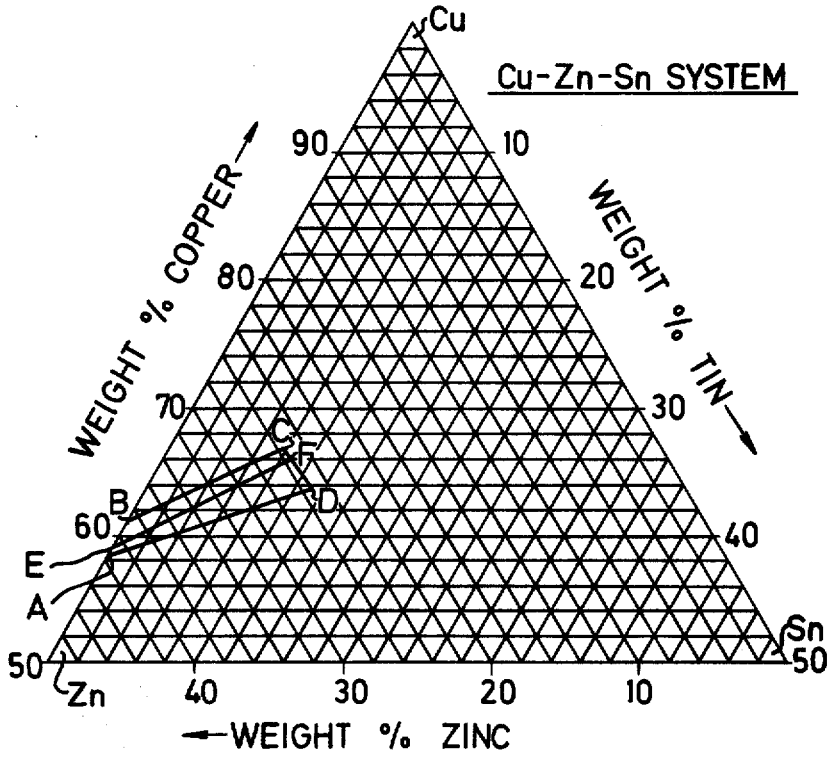

The preferred composition limits for this system are given below in conjunction with FIG. 2.

Wt. percent (A) 41.5, Zn; 58.5, Cu
(B) 38.5, Zn; 61.4, Cu
(C) 66.7, Cu; 7.8, Sn; 25.5, Zn
(D) 63.7, Cu; 11.0, Sn; 25.3, Zn
(E) 59.3, Cu; 40.7, Zn
(F) 66.0, Cu; 25.5, Zn; 8.5, Sn All alloys within this composition range exhibit heat recoverable properties when heated above their $A_s$ after deformation at temperatures either above or below the $M_s$.

For alloys within the composition range AEFD, to exhibit heat recoverable properties they must be quenched into water from not below 750° C. Alloys outside of this range i.e. EBCF, must be quenched from higher temperatures. At the zinc rich end (i.e. BE) they must be quenched into water from at least 850° C. As the Sn content is increased the quenching temperature (i.e. the temperature from which quenching must be effected) progressively decreases until the compositions CF where the quenching temperature is at least 810° C.

The alloys in this ternary system had similar characteristics to those in the Cu-Al-Zn system in that the yield stress was a minimum and the ductility (i.e. total strain at fracture) a maximum when the material was deformed at its $M_s$. Ductility decreased as tin replaced zinc.

One of the alloys in this system which were tested (alloy 488) had a composition 63.85 wt. percent Cu, 31.25 wt. percent Zn, 4.9 wt. percent Sn; this alloy had an $M_s$ of −70° C. One new phenomenon that was observed during the testing of this alloy was what may be termed as reverse heat-recoverable strain; this was the first time that this effect had been found.

Its physical appearance can be described as follows: If a straight section of the alloy is quenched from 800° C. into water, the $\beta$ structure is retained as the metastable B' ordered structure which in the case of the above alloy undergoes a martensitic transformation on subzero cooling. If at this temperature, the section is bent to a right angle, then on heating through its $A_s$ temperature it will return to its straight position; on further heating (at approximately 250° C.) it spontaneously changes shape in the original imposed direction i.e., it bends towards a right angle. The amount of this so-called reverse heat-recoverable strain is comparatively small but it may be increased by suitable choices of deformation temperatures and microstructure.

The results of the heat-recoverable strain and reverse heat-recoverable strain experiments are summarized in Table IX.

TABLE IX

| Def. temp., °C. | Percent: Deformation | Apparent elastic recovery | Retained strain | Heat recoverable strain | Reverse heat recoverable strain |
|---|---|---|---|---|---|
| −115 | [a]4.5 | | | | |
| −115 | 4.2 | 1.2 | 3 | 2.7 | 0.55 |
| −77 | [a]4.5 | | | | |
| −77 | 4 | 1.1 | 2.90 | 2.75 | 0.35 |

TABLE IX-continued

| Def. temp., °C. | Percent: Deformation | Apparent elastic recovery | Retained strain | Heat recoverable strain | Reverse heat recoverable strain |
|---|---|---|---|---|---|
| −67 | [a]7 | | | | |
| −67 | 4 | 1.2 | 2.8 | 2.4 | 0.4 |
| −67 | 6 | 1.8 | 4.2 | 3.6 | 1.0 |
| −54 | [a]6 | | | | |
| −54 | 4 | 1.45 | 2.55 | 2.3 | 0.45 |
| −26 | [a]5 | | | | |
| −26 | 4 | 1.6 | 2.4 | 1.7 | 0.55 |
| +25 | [a]4.5 | | | | |
| +25 | 4.2 | 2.2 | 2.0 | 1.05 | 0.6 |
| +50 | [a]4.5 | | | | |
| +50 | 4.0 | 2.4 | 1.6 | 0.1 | 0.75 |

[a]Maximum possible deformation. Specimen tested to failure.

Alloy 488 was also used to illustrate the phenomena of suppression of recovery by heating under restraint. Samples were deformed 2.8% in tension at −80° C. and were then loaded to stresses up to 30,000 lb.$_f$/in.$^2$. On heating to ambient temperature, the amount of heat recoverable strain was found to decrease with increasing stress as shown in Table X.

TABLE X

| Retained load (p.s.i.) | Percent: Perm. def. | Recovery | Max. recovery |
|---|---|---|---|
| 0 | 2.8 | 2.6 | [a]100 |
| 10 × 10$_3$ | 2.8 | 2.55 | 99 |
| 20 × 10$_3$ | 2.8 | 2.1 | 75 |
| 25 × 10$_3$ | 2.8 | 1.95 | 70 |
| 30 × 10$_3$ | 2.8 | 1.75 | 60 |
| 35 × 10$_3$ | | Fractured[a] | |

[a]Nominal.

If the stress used exceeded the yield stress of the high temperature phase, rapid extension occurred as the specimen was heated through the $A_s$ temperature and as these specimens were dead loaded, extension occurred until the sample fractured. If the specimen is heated under restraint at constant strain, stress relaxation occurs at $A_s$ once the stress due to transformation reaches the yield stress and no failure ensues. This reduces the amount of total strain recoverable when the restraint is unloaded.

(v) Ternary copper-zinc-silicon alloys

Figure 3:
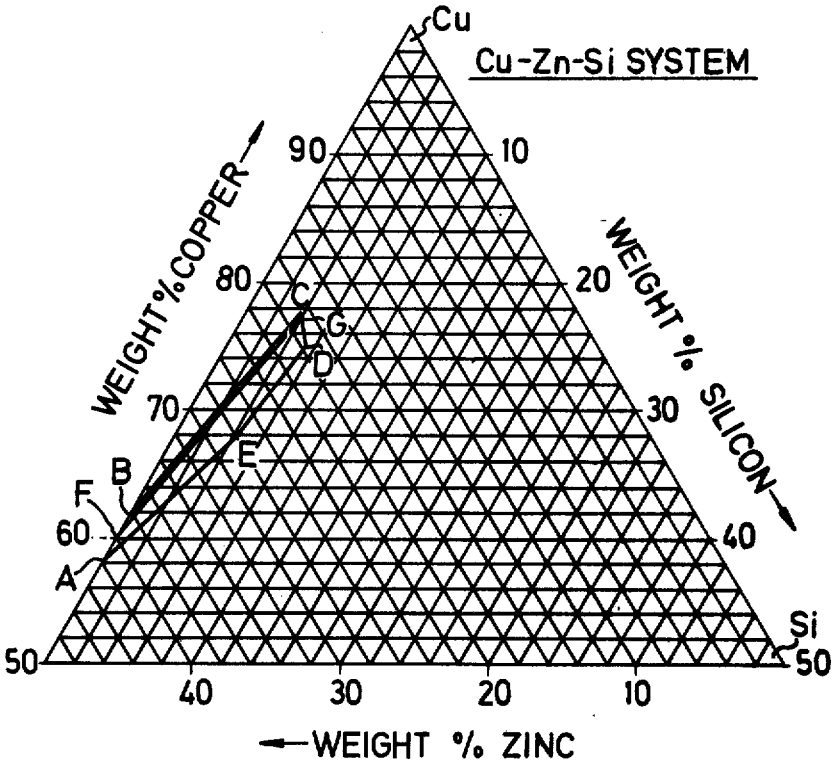

The preferred composition limits for the Cu-Zn-Si system are given below in conjunction with FIG. 3.

Wt. percent (A) 58.5, Cu; 41.5, Zn
(B) 61.4, Cu; 38.6, Zn
(C) 77.2, Cu; 9.3, Zn; 3.5, Si
(D) 75.0, Cu; 19.8, Zn; 5.2, Si
(E) 68.0, Cu; 28.0, Zn; 4.0, Si
(F) 60.2, Cu; 39.8, Zn
(G) 77.0, Cu; 19.3, Zn; 3.7, Si All alloys within this composition range exhibit heat recoverable properties when heated above their $A_s$ after deformation at temperatures either above or below the $M_s$.

For alloys within the composition range AFGDE to exhibit heat recoverable properties, they must be quenched from not below 825° C. Alloys within the range BCGF must be quenched from not below 850° C.

The alloys in this ternary system had similar characteristics to those in the two ternary systems which were previously described in that the yield stress was a minimum and the ductility a maximum when the material was deformed between $M_s$ and $M_f$.

Specific examples are as follows:

Alloy 521, which had a nominal composition 63.75 wt. percent Cu, 34.5 wt. percent Zn, 1.75 wt. percent Si and an $M_s$ of −140° C., gave results shown in Table XI.

TABLE XI

| | Percent | | | |
|---|---|---|---|---|
| Def. temp. (°C.) | Strain | Apparent elastic recovery | Retained strain | Heat recoverable strain |
| +20 | [a]8.5 | | | |
| +20 | 4.0 | 3.0 | 1.0 | 0.1 |
| −80 | [a]8.3 | | | |
| −80 | 5.0 | 5.0 | | |
| −80 | 8.0 | 6.2 | 1.8 | 0.65 |
| −80 | 8.2 | 7.2 | 1.0 | 0.5 |
| −196 | [a]8.0 | | | |
| −196 | 5.0 | 1.0 | 4.0 | 4.0 |
| −196 | 6.5 | 1.2 | 5.3 | 5.3 |
| −196 | 8.0 | 1.6 | 6.4 | 6.3 |

Alloy 515, which had a nominal composition 66.5 wt. percent Cu, 31.25 wt. percent Zn, 2.25 wt. percent Si and an $M_s$ of −50° C., gave results shown in Table XII.

TABLE XII

| | Percent | | | |
|---|---|---|---|---|
| Def. temp. (°C.) | Strain | Apparent elastic recovery | Retained strain | Heat recoverable strain |
| +20 | [a]10.4 | | | |
| +20 | 7.2 | 5.2 | 2.0 | 0.75 |
| +20 | 8.8 | 6.0 | 2.8 | 1.5 |
| −80 | [a]9.0 | | | |
| −80 | 4.1 | 0.8 | 3.3 | 3.0 |
| −80 | 6.25 | 1.2 | 5.05 | 4.9 |
| −80 | 6.3 | 1.8 | 6.5 | 6.0 |
| −196 | [a]7.0 | | | |
| −196 | 2.2 | 0.8 | 1.4 | 1.4 |
| −196 | 4.55 | 1.2 | 3.35 | 3.2 |
| −196 | 6.05 | 1.4 | 4.65 | 3.95 |

[a]Maximum strain; specimen tested to failure.

Alloy 522, which had a nominal composition 69.25 wt. percent Cu, 27.5 wt. percent Zn, 3.25 wt. percent Si and $M_s$ of +75° C., gave results shown in Table XIII.

TABLE XIII

| | Percent | | | |
|---|---|---|---|---|
| Def. temp. (°C.) | Strain | Apparent elastic recovery | Retained strain | Heat recoverable strain |
| +20 | [a]7.8 | | | |
| +20 | 6.6 | 1.7 | 4.9 | 1.85 |
| +65 | [a]6.2 | | | |
| +65 | 5.0 | 1.0 | 4.0 | 2.95 |
| +100 | [a]6.5 | | | |
| +100 | 6.0 | 3.5 | 2.5 | 1.7 |

[a]Maximum strain; specimen tested to failure.

Alloy 521 also illustrates the effect of heating under a restraining stress. Samples were deformed 4.8% in tension at −196° C. They were then heated to ambient temperature under various stresses up to 35,000 lb.$_f$/in.$^2$ and the amount of strain recovered measured. One sample was stressed to 40,000 lb.$_f$/in.$^2$ which is above the yield stress of the high temperature phase. This sample extended rapidly just above the $A_s$ temperature. Since the specimens were dead-loaded, this caused rapid extension and ultimate failure. Results are shown in Table XIV.

TABLE XIV

| | Percent | | |
|---|---|---|---|
| Retained load (p.s.i.) | Perm. def. | Recovery | Max. recovery |
| 0 | 4.8 | 4.8 | 100 |
| $10 \times 10^3$ | 4.8 | 4.65 | 97 |
| $20 \times 10^3$ | 4.8 | 4.5 | 94 |
| $30 \times 10^3$ | 4.8 | 3.25 | 68 |
| $35 \times 10^3$ | 4.8 | 2.3 | 48 |
| $40 \times 10^3$ | 4.8 | [1]Fractured | |

[1]Rapid creep extension leading to fracture occurred as the specimen was heated through the $A_s$ temperature.

On unloading all specimens some recovery of the total strain was achieved.

A feature of Cu-Zn-Si alloys in the high apparently elastic (or pseudo-elastic) contraction on unloading samples deformed above the $M_s$ temperature.

(vi) Ternary copper-aluminium-manganese alloys

Figure 4:
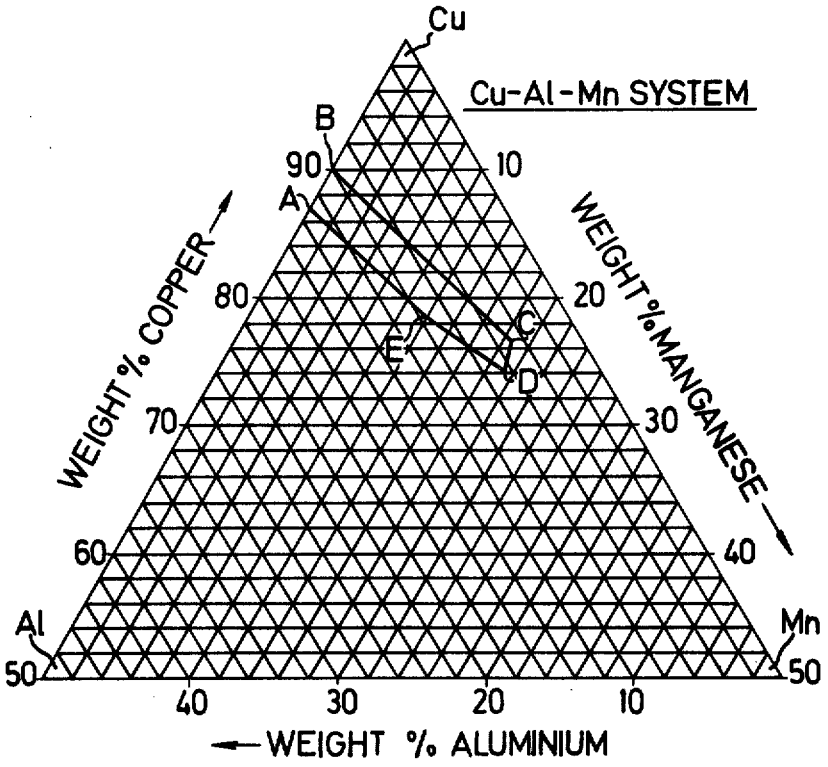

The preferred composition limits for this system are given below in conjunction with FIG. 4.

Wt. percent (A) 87.0 Cu; 13.0 Al
(B) 90.0 Cu; 10.0 Al
(C) 76.2 Cu; 5.3 Al; 18.5 Mn
(D) 74.0 Cu; 6.5 Al; 19.5 Mn
(E) 87.1 Cu; 9.8 Al; 12.0 Mn To produce alloys with the correct structure to undergo a martensitic transformation, alloys within this composition field are preferably quenched from not below 900° C. into water.

The alloys in this ternary system had similar characteristics to those described in the previous ternary systems in that the yield stress was a minimum and the ductility a maximum when the material was deformed between $M_s$ and $M_f$ temperatures.

Specific examples of alloys in this system are given below:

Wt. percent (992) 86.0, Cu; 12.0, Al; 2.0, Mn
(993) 84.5, Cu; 11.25, Al; 4.25, Mn
(994) 83.25, Cu; 10.75, Al; 6.0, Mn Alloy 992 had an $M_s$ of +240° C., 993 an $M_s$ of +160° C., and 994 an $M_s$ of +100° C.

All of these alloys exhibited heat recoverable properties after deformation either above or below the $M_s$. Test results are given in Table XV.

TABLE XV

| | | Percent | |
|---|---|---|---|
| Alloy | Def. temp., °C. | Retained strain | Heat recoverable strain |
| 992 | 290 | 3.2 | 0.85 |
| | 240 | 3.5 | 0.85 |
| | 140 | 3.0 | 0.95 |
| | 20 | 2.7 | 0.80 |
| | −196 | 2.7 | 0.75+C. |
| 693 | 260 | 3.6 | 0.25 |
| | 210 | 3.2 | 0.4 |
| | 160 | 3.0 | 0.45 |

TABLE XV-continued

| Alloy | Def. temp., °C. | Percent Retained strain | Percent Heat recoverable strain |
|---|---|---|---|
| | 60 | 3.0 | 0.30 |
| | 20 | 3.0 | 0.35 |
| | −196 | 3.0 | 0.35+C. |
| 994 | 150 | 3.1 | 0.30 |
| | 100 | 3.4 | 0.30 |
| | 20 | 3.4 | 0.45 |
| | −196 | 2.8 | 0.30+C. |

A feature of Cu-6n-Si alloys is the high apparently served in the Cu-Al-Zn ternary system was observed in all specimens of the above alloys after deformation at −196° C. (indicated by +C).

(vii) Ternary copper-aluminium-iron alloys

Figure 5:
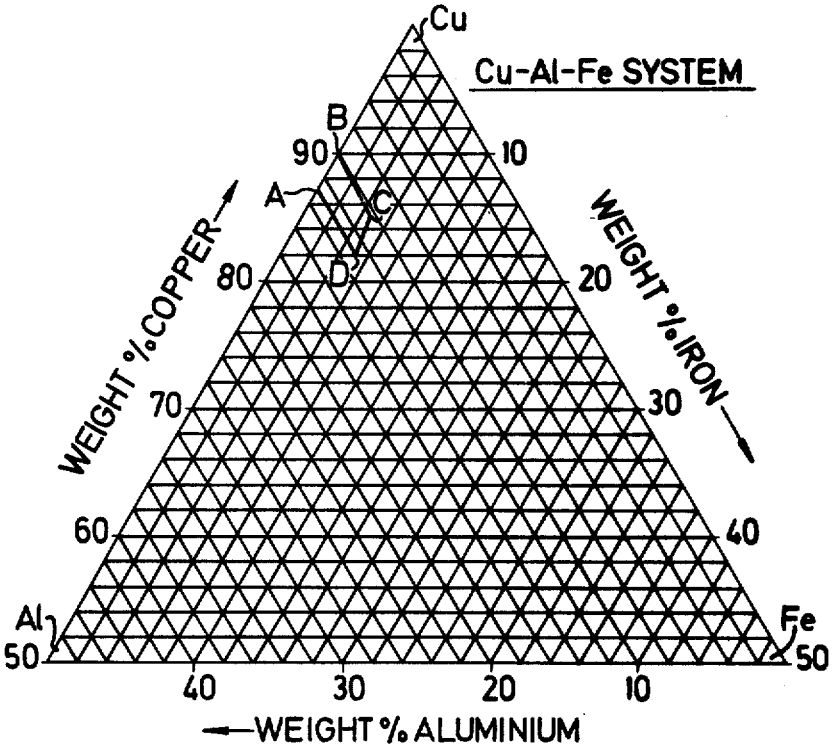

The preferred composition limits for this system are given below in conjunction with FIG. 5.

Wt. percent (A) 87.0, Cu; 13.0, Al
(B) 90.0, Cu; 10.0, Al
(C) 8.47, Cu; 10.3, Al; 5.0, Fe
(D) 81.7, Cu; 13.0, Al; 5.3, Fe To produce alloys with the correct structure to undergo a martensitic transformation, alloys within this field are preferably quenched from not below 900° C. into water.

The alloys in this ternary system had similar characteristics to those alloys previously described in that the yield stress was a minimum and the ductility a maximum when the material was deformed between its $M_s$ and $M_f$ temperatures.

Specific examples of alloys in this system are given below:

Wt. percent (989) 86.5, Cu; 12.5, Al; 1.0, Fe
(990) 84.5, Cu; 12.5, Al; 8.0, Fe
(991) 82.25, Cu; 12.5, Al; 5.25, Fe Alloy 989 has an $M_s$ of +300° C., 990 an $M_s$ of +250° C., and 991 an $M_s$ of +250° C.

The results of tests are given in Table XVI.

TABLE XVI

| Alloy | Def. temp., °C. | Percent Retained strain | Percent Heat recoverable strain |
|---|---|---|---|
| 989 | 300 | Fractured | |
| | 250 | 2.8 | 1.05 |
| | 20 | 3.2 | 1.70 |
| | −196 | 3.6 | 1.75 + C. |
| 990 | 300 | 4.3 | 1.1 |
| | 250 | 3.6 | 0.85 |
| | 150 | 3.1 | 0.85 |
| | 20 | Fractured | |
| | −196 | Fractured | |
| 991 | 300 | 3.2 | 0.55 |
| | 250 | 3.15 | 0.50 |
| | 150 | 3.10 | 0.65 |
| | 20 | 3.20 | 0.70 |
| | −196 | 2.0 | 0.35 + C. |

The presence of iron thus increased the ductility of the copper-aluminium alloys sufficiently for about 3% retained strain to be obtained in tension. This was associated with a refinement in grain size.

All of these Cu-Al-Fe alloys exhibited heat recoverable properties after deformation either above or below the $M_s$. These alloys also exhibited the Invar-like effect after deformation at −196° C.

(viii) Ternary copper-aluminium-nickel alloys

Figure 6:
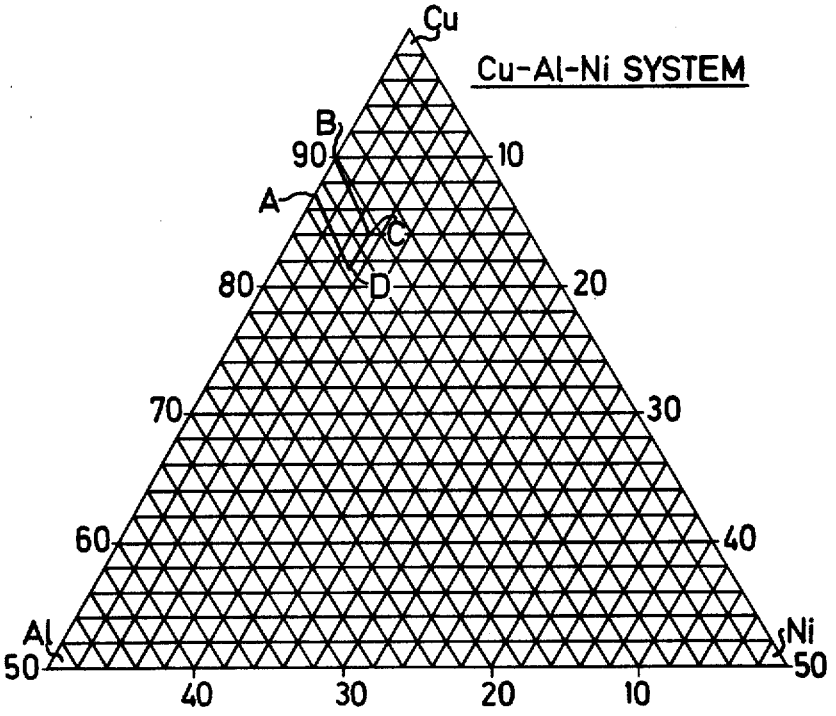

The preferred limits for this system are given below in conjunction with FIG. 6.

Wt. percent

Wt. percent (vii) Ternary copper-aluminium-iron alloys (A) 87.0, Cu; 13.0, Al
(B) 90.0, Cu; 10.0, Al
(C) 84.0, Cu; 11.0, Al; 5.0, Ni
(D) 81.25, Cu; 13.75, Al; 5.0, Ni To produce alloys with the correct structure to undergo a martensitic transformation, alloys within this field are preferably quenched from not below 950° C. into water.

Alloys within this composition field have relatively low ductility unless deformed at very low temperatures e.g. −196° C.; however, they do exhibit heat recoverable properties after deformation either above or below the $M_s$.

An example of an alloy in this composition field is one containing 84 wt. percent Cu, 2.75 wt. percent Ni, 13.25 wt. percent Al; this alloy has an $M_s$ of +82° C. By using the simple bending technique, heat recoverable properties were exhibited by this alloy after deformation in the temperature range −196° C. to +120° C. However, when corresponding tests were conducted in the tensile machine, only in specimens deformed at +82° C. i.e. that $M_s$ temperature and at −196° C. was any significant plastic deformation produced.

In the specimen deformed at +82° C. the maximum strain that could be produced was 4%, of this 1% was elastic recovery and 3% permanent strain. On heating above the $A_s$ 2.9% of the latter was recovered. In the specimen deformed at −196° C. the maximum strain that could be produced in the alloy was 5%; of this 1.6% recovered elastically on unloading and 3.4% was permanent, 2.5% of the latter was recovered upon heating above the $A_s$.

Also, the Invar type effect (i.e. recovery between −196° C. and +20° C.) was observed in this alloy after deformation at −196° C. and this alloy provides another example of those showing an effectively zero coefficient of expansion over this temperature range.

If the alloys used in the present invention are permanently deformed just above their $M_s$, on quenching through the $M_s$, the material tends to move in the direction of the applied deformation.

This is explained simply as follows. If a straight strip of the material is deformed in the direction of a right angle, on quenching through the $M_s$, the material spontaneously deforms further towards the right angle position (i.e. in the direction of the applied deformation). On heating above the $A_s$ all of this spontaneous deformation is regained i.e. the material reassumes its original deformed shape.

Two alloys will be quoted as examples. These are alloy 515 Cu-Zn-Si (65 at percent Cu, 30 at percent Zn, 5 at percent Si) which had an $M_s$ of −50° C. and alloy 508 Cu-Zn-Al (69 at percent Cu, 15 at percent Zn, 16 at percent Al) which had an $M_s$ of −8° C. Both of these alloys were deformed at two temperatures above the $M_s$; these temperatures were in the range where deformation produced marked pseudo-elasticity (i.e. a stress induced martensite).

The results are summarized below in Table XVII.

| Alloy | Def. temp. | Percent Def. | Elastic springback | Perm. def. | Spon. def. |
|---|---|---|---|---|---|
| 515 | $M_s$ + 75° C. | 3 | 2.85 | 0.15 | 1.7 |
| | $M_s$ + 75° C. | 5 | 4.3 | 0.7 | 2.05 |
| | $M_s$ + 75° C. | 7 | 5.6 | 1.4 | 2.55 |
| | $M_s$ + 75° C. | [a]7.5 | | | |
| | $M_s$ + 25° C. | 5 | 4.7 | 0.3 | 1.35 |
| | $M_s$ + 25° C. | 7 | 6.4 | 0.6 | 2.15 |
| | $M_s$ + 25° C. | [a]8 | | | |
| 508 | $M_s$ + 33° C. | 4 | 3.4 | 0.6 | 0.45 |
| | $M_s$ + 33° C. | 6 | 5 | 1.0 | 1.45 |
| | $M_s$ + 33° C. | [a]6.5 | | | |
| | $M_s$ + 58° C. | 2 | 1.9 | 0.1 | 0.45 |
| | $M_s$ + 58° C. | 4 | 3.6 | 0.4 | 0.95 |
| | $M_s$ + 58° C. | [a]4.5 | | | |

[a]Maximum possible deformation before failure.

It has been shown previously that after deformation above the $M_s$ some of the residual deformation may be recovered by heating above the deformation temperature. It is considered that it is this part of the residual deformation which is responsible for the directionality on subsequent cooling below the $M_s$. Therefore, for this phenomenon to be observed the material must be deformed in the temperature range where this form of recoverable deformation is produced. This temperature range is approximately $M_s$ to $M_s$ +70° C.

In the experiments which have been described previously, the results have been obtained from alloys containing only a single phase, which has been in either the retained B or martensitic state. Experiments were also conducted upon alloys which were quenched from a temperature such that the microstructure was two phase.

In the Cu-Al-Zn system, the duplex structure could be either $(\alpha+\beta)$ or $(\gamma+\beta)$. Alloys with the $(\gamma+\beta)$ structure were extremely brittle, this embrittlement being due to the precipitation of the $\gamma$ phase. Consequently, it is not possible for alloys with this type of microstructure to exhibit heat recoverable properties simply because it is extremely difficult to deform them. Since the $\alpha$ phase is a Cu rich phase, precipitation of this phase depletes the $\beta$ matrix in Cu, and as a result the $M_s$ of the alloy is decreased.

An example of this is an alloy of composition 66 wt. percent Cu, 32.25 wt. percent Zn, 1.75 wt. percent Al. When the alloy was quenched from 900° C., it was single phase and had an $M_s$ of +10° C. However, when it was quenched from 750° C., the structure was duplex $(\alpha+\beta)$ and as a result the $M_s$ was depressed to −70° C. The $\alpha$ phase which constituted 50% of the structure was discontinuous and globular in form. This two phase was deformed 3.4% at −78° C. (i.e. just below the $M_s$); upon heating above the $A_s$ 2.8% of this deformation was recovered.

Similar experiments have been conducted upon Cu-Zn-Si and Cu-Zn-Sn ternary alloys. The Cu-Zn-Si alloy 515 when quenched from 825° C. had a single phase structure and an $M_s$ of −50° C. When this alloy was quenched from 550° C., a two phase $(\alpha+\beta)$ structure was produced; the $\alpha$-phase which was in rod-like form constituted approximately 50% of the matrix and as a result the $M_s$ was depressed to −190° C. This alloy was deformed 3.1% at −196° C., and upon heating the $A_s$ 3% of this deformation was recovered.

The Cu-Zn-Sn alloy studied was 488 which in the single phase condition had an $M_s$ of −70° C. When quenched from 700° C. the microstructure of the alloy consisted of a $\beta$ matrix containing a regular distribution of the $\alpha$ phase in the form of globules dispersed regularly throughout the matrix. The $\alpha$ phase constituted approximately 40% of the structure and as a result the $M_s$ was depressed to −130° C. This alloy was deformed over a range of temperatures; the results are summarized below in Table XVIII.

TABLE XVIII

| Def. temp., °C. | Percent Def. | Elastic recovery | Perm. def. | Recovery | Spontaneous strain at 250° C. |
|---|---|---|---|---|---|
| −196 | 4 | 1.2 | 2.8 | 2.8 | |
| −115 | 4 | 1.9 | 2.1 | 1.9 | 0.38 |
| −67 | 4 | 2.6 | 1.4 | 1.1 | 0.7 |
| +25 | 4 | 2.7 | 1.3 | 0.1 | 1.25 |
| +50 | 6 | 2.0 | 4.0 | 0.35 | 2.17 |

One interesting result from this series of experiments was that the precipitation of the $\alpha$ phase does not appreciably reduce the heat recoverable properties of the alloy whereas it does appear to increase the amount of spontaneous strain especially when the initial deformation takes place well above the $M_s$.

The results of the experiments to determine the effect of the precipitation of a second phase upon heat recoverable properties demonstrates that up to, at least, 50% of the second phase has very little effect upon these properties. Consequently, the precipitation of a second phase may have beneficial properties in that:

(1) for any one alloy of specific composition the $M_s$ may be varied simply by altering the amount of second phase present.

(2) the precipitation of the second phase could lead to improved mechanical properties of these alloys.

(ix) The following are examples of other alloys comprising intermetallic compounds which may be used in the method of the present invention.

Silver-aluminium containing 6–10% aluminium
Silver-cadmium containing 40–55% cadmium
Silver-magnesium containing 11–30% magnesium
Silver-platinum containing 20–50% platinum
Silver-zinc containing 26–46% zinc
Gold-aluminium containing 4% aluminium
Gold-indium containing 10–12% indium
Gold-magnesium containing 6–15% magnesium
Gold-manganese containing 12–38% manganese
Gold-zinc containing 16–30% zinc
Gold-copper containing 70–80% gold
Cobalt-platinum containing 12–30% cobalt
Iron-platinum containing 16–30% iron.

While, in the foregoing examples, reference has been made to binary and ternary alloys, it will be understood that the alloys may also contain impurities and incidental constituents. For example, Mn and Fe may be added to Cu-Zn alloys, and Sn and Si may be added to Cu-Al alloys, or to more complex alloys containing those elements. It is of course always necessary that the alloy has a composition such that heat-recovery as hereinbefore described is obtained.

The heat-recoverable properties possessed by articles made in accordance with the present invention render them useful for many purposes where a change of shape of temperature is necessary. For example, they may be used as tubes in couplings, which tubes change shape to grip two elements to be connected together, as temperature-responsive devices in switching devices and as springs.

It is known that certain specific nickel-titanium, gold-cadmium, gold-silver-cadmium, and copper-aluminium-nickel alloys have heat-recoverable properties. In the copper-aluminium-nickel alloy known to have these properties, a beta phase transforms to a gamma phase and there is no transformation into martensite having pseudo-cubic symmetry. We make no claim to a method of making heat-recoverable articles from said known alloys simply by cooling and deforming.

Subject to the foregoing disclaimer; what we claim is set out in the following claims.

We claim:

1. A method of making a heat-recoverable article, which method comprises cooling an alloy in a first shape from a first temperature to a lower temperature, said alloy comprising an intermetallic compound of copper which compound undergoes a shear transformation to a banded martensite *below the $A_F$ temperature* and which compound in the cooled condition has an anomalously low modulus of elasticity during loading, and then plastically deforming the alloy into a second shape at the lower temperature, the temperature and rate of cooling being such that on reheating the article at least partly resumes its first shape, *said alloy containing at least 50% by weight of copper in the form of an intermetallic compound and said martensite having pseudo-cubic symmetry.*

[2. A method according to claim 1 in which the alloy contains at least 50% by weight of copper in the form of an intermetallic compound and said martensite has pseudo-cubic symmetry.]

3. A method according to claim [2] *1* in which the alloy contains zinc, the balance (except for any impurities and incidental constituents which may be present) being copper.

4. A method according to claim [2] *1* in which the alloys contains aluminium, the balance (except for any impurities and incidental constituents which may be present) being copper.

5. A method according to claim [2] *1* in which the alloy contains aluminium and zinc, the balance (except for any impurities and incidental constituents which may be present) being copper.

6. A method according to claim [2] *1* in which the alloy contains zinc and tin, the balance (except for any impurities and incidental constituents which may be present) being copper.

7. A method according to claim [2] 'in which the alloy contains zinc and silicon, the balance (except for any impurities and incidental constituents which may be present) being copper.

8. A method according to claim [2] *1* in which the alloy contains aluminium and manganese, the balance (except for any impurities and incidental constituents which may be present) being copper.

9. A method according to claim [2] *1* in which the alloy contains aluminium and iron, the balance (except for any impurities and incidental constituents which may be present) being copper.

10. A method according to claim 1 in which said rate of cooling and lower temperature are such that the alloy has undergone a shear transformation to a banded martensite before being plastically deformed into said second shape.

11. A method according to claim 1 in which said rate of cooling and lower temperature are such that the alloy retains its first temperature structure or a related ordered structure at said lower temperature and the plastic deformation into said second shape causes a shear transformation into a banded martensite.

12. A method according to claim 11 in which after deformation into said second shape the alloy is cooled to below the temperature at which transformation into martensite would have been caused by cooling alone.

13. A method according to claim 1 including the step of raising the temperature of the alloy after it has been deformed into said second shape so that it changes shape towards said first shape.

14. A method of making a heat-recoverable article, which method comprises cooling an alloy in a first shape from a first temperature to a lower temperature, said alloy comprising an intermetallic compound of silver which compound undergoes a shear transformation to a banded martensite and which compound in the cooled condition has an anomalously low modulus of elasticity during loading, and then plastically deforming the alloy into a second shape at the lower temperature, the temperature and rate of cooling being such that on reheating the article at least partly resumes its first shape.

15. A method according to claim 14 in which the alloy contains not more than 10% by weight of aluminium.

16. A method according to claim 14 in which the alloy contains not more than 55% by weight of cadmium.

17. A method according to claim 14 in which the alloy contains not more than 30% by weight of magnesium.

18. A method according to claim 14 in which the alloy contains not more than 50% by weight of platinum.

19. A method according to claim 14 in which the alloy contains not more than 46% by weight of zinc.

20. A method of making a heat-recoverable article, which method comprises cooling an alloy in a first shape from a first temperature to a lower temperature, said alloy consisting of a gold-aluminium intermetallic compound containing not more than 4% by weight of aluminium which compound undergoes a shear transformation to a banded martensite and which compound in the cooled condition has an anomalously low modulus of elasticity during loading, and then plastically deforming the alloy into a second shape at the lower temperature, the temperature and rate of cooling being such that on reheating the article at least partly resumes its first shape.

21. A method of making a heat-recoverable article, which method comprises cooling an alloy in a first shape from a first temperature to a lower temperature, said alloy consisting of a gold-indium intermetallic compound containing not more than 12% by weight of indium which compound undergoes a shear transformation to a banded martensite and which compound in the cooled condition has an anomalously low modulus of elasticity during loading, and then plastically deforming the alloy into a second shape at the lower temperature, the temperature and rate of cooling being such that on reheating the article at least partly resumes its first shape.

22. A method of making a heat-recoverable article, which method comprises cooling an alloy in a first shape from a first temperature to a lower temperature, said alloy consisting of a gold-magnesium intermetallic compound containing not more than 15% by weight of magnesium which compound undergoes a shear transformation to a banded martensite and which compound in the cooled condition has an anomalously low modulus of elasticity during loading, and then plastically deforming the alloy into a second shape at the lower temperature, the temperature and rate of cooling being such that on reheating the article at least partly resumes its first shape.

23. A method of making a heat-recoverable article, which method comprises cooling an alloy in a first shape from a first temperature to a lower temperature, said alloy consisting of a gold-manganese intermetallic compound containing not more than 38% by weight of manganese which compound undergoes a shear trasnsformation to a banded martensite and which compound in the cooled condition has an anomalously low modulus of elasticity during loading, and then plastically deforming the alloy into a second shape at the lower temperature, the temperature and rate of cooling being such that on reheating the article at least partly resumes its first shape.

24. A method of making a heat-recoverable article, which method comprises cooling an alloy in a first shape from a first temperature to a lower temperature, said alloy consisting of a gold-zinc intermetallic compound containing not more than 30% by weight of zinc which compound undergoes a shear transformation to a banded martensite and which compound in the cooled condition has an anomalously low modulus of elasticity during loading, and then plastically deforming the alloy into a second shape at the lower temperature, the temperature and rate of cooling being such that on reheating the article at least partly resumes its first shape.

25. A method of making a heat-recoverable article, which method comprises cooling an alloy in a first shape from a first temperature to a lower temperature, said alloy consisting of a gold-copper intermetallic compound containing not more than 80% by weight of gold which compound undergoes a shear transformation to a banded martensite and which compound in the cooled condition has an anomalously low modulus of elasticity during loading, and then plastically deforming the alloy into a second shape at the lower temperature, the temperature and rate of cooling being such that on reheating the article at least partly resumes its first shape.

26. A method of making a heat-recoverable article, which method comprises cooling an alloy in a first shape from a first temperature to a lower temperature, said alloy consisting of a cobalt-platinum intermetallic compound containing not more than 30% by weight of cobalt which compound undergoes a shear transformation to a banded martensite and which compound in the cooled condition has an anomalously low modulus of elasticity during loading, and then plastically deforming the alloy into a second shape at the lower temperature, the temperature and rate of cooling being such that on reheating the article at least partly resumes its first shape.

27. A method of making a heat-recoverable article, which method comprises cooling an alloy in a first shape from a first temperature to a lower temperature, said alloy consisting of an iron-platinum intermetallic compound containing not more than 30% by weight of iron which compound undergoes a shear transformation to a banded martensite and which compound in the cooled condition has an anomalously low modulus of elasticity during loading, and then plastically deforming the alloy into a second shape at the lower temperature, the temperature and rate of cooling being such that on reheating the article at least partly resumes its first shape.

28. A heat-recoverable article made by the method according to claim 1.

29. Apparatus including a heat-recoverable article according to claim 28, the article performing a function in said apparatus by virtue of its property of changing shape with temperature.

*30. A thermally actuated device comprising at least one element consisting of an intermetallic compound containing at least 60 weight percent of copper which has been plastically deformed at a first temperature and which has the capability of retaining the deformed shape until heated to a predetermined transition temperature at which it reverts back to its original shape, said intermetallic compound having a crystal structure which below the said transition temperature has a pseudo -cubic symmetry and an atomic packing density which is higher than the atomic packing density above the said transition temperature.*

*31. A thermally actuated device as claimed in claim 30 in which the crystal structure of said intermetallic compound, below said transition temperature, has a dodecahedral atom arrangement.*

*32. A thermally actuated device comprising at least one element consisting of an intermetallic compound containing at least 60 weight percent of copper which has been plastically deformed at a first temperature and which has the capability of retaining the deformed shape until heated to a predetermined transition temperature at which it reverts back to its original shape, said intermetallic compound having a crystal structure which below the said transition temperature has an atomic packing density which is higher than the atomic packing density above the said transition temperature, said intermetallic compound being a binary copper-aluminum alloy containing 10.0 to 13.0 weight percent aluminum.*

*33. A thermally actuated device comprising at least one element consisting of an intermetallic compound containing at least 60 weight percent of copper which has been plastically deformed at a first temperature and which has the capability of retaining the deformed shape until heated to a predetermined transition temperature at which it reverts back to its original shape, said intermetallic compound having a crystal structure which below the said transition temperature has an atomic packing density which is higher than the atomic packing density above the said transition temperature, said intermetallic compound being a binary copper-zinc alloy containing 38.6 to 41.5 weight percent zinc.*

*34. A thermally actuated device comprising at least one element consisting of an intermetallic compound containing at least 50 weight percent of copper which has been plastically deformed at a first temperature and which has the capacity of retaining the deformed shape until heated to a predetermined transition temperature at which it reverts back to its original shape, said intermetallic compound having a crystal structure which below the said transition temperature has an atomic packing density which is higher than the atomic packing density above the said transition temperature.*

*35. A thermally actuated device comprising at least one element consisting of an intermetallic compound contain-*

*ing at least 50 weight percent of copper which has been plastically deformed at a first temperature and which has the capability of retaining the deformed shape until heated to a predetermined transition temperature at which it reverts back to its original shape, said intermetallic compound having a crystal structure which below the said transition temperature has an atomic packing density which is higher than the atomic packing density above the said transition temperature, said intermetallic compound being a binary copper zinc alloy containing 38.6 to 41.5 weight percent zinc.*

* * * * *